March 3, 1970  J. E. GUTRIDGE  3,498,480
AUTOMOBILE TRANSPORTING SYSTEM
Filed Dec. 14, 1966  4 Sheets-Sheet 2
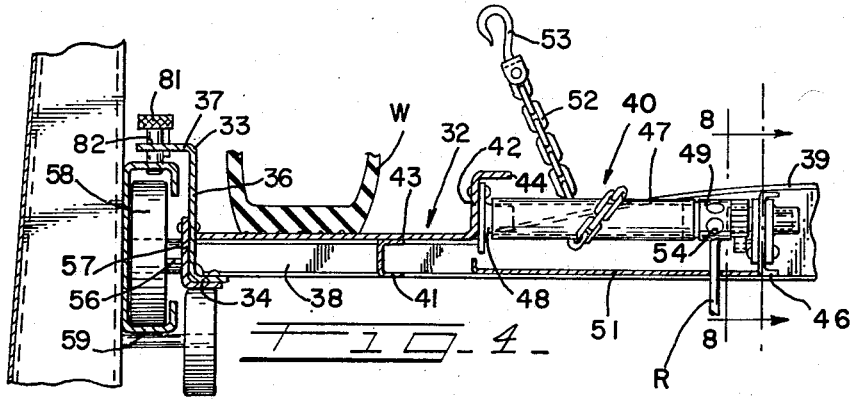
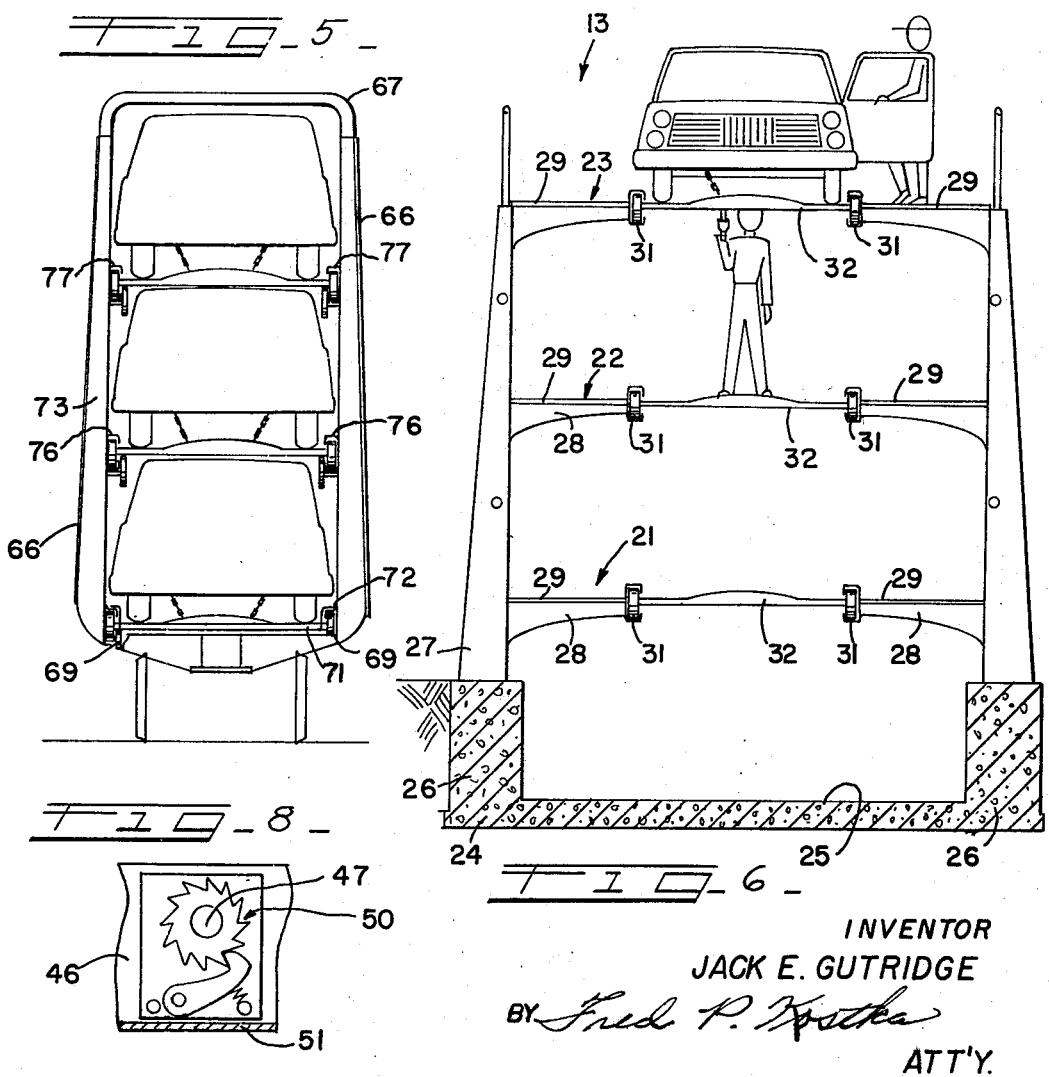
INVENTOR
JACK E. GUTRIDGE
BY Fred P. Kostka
ATT'Y.

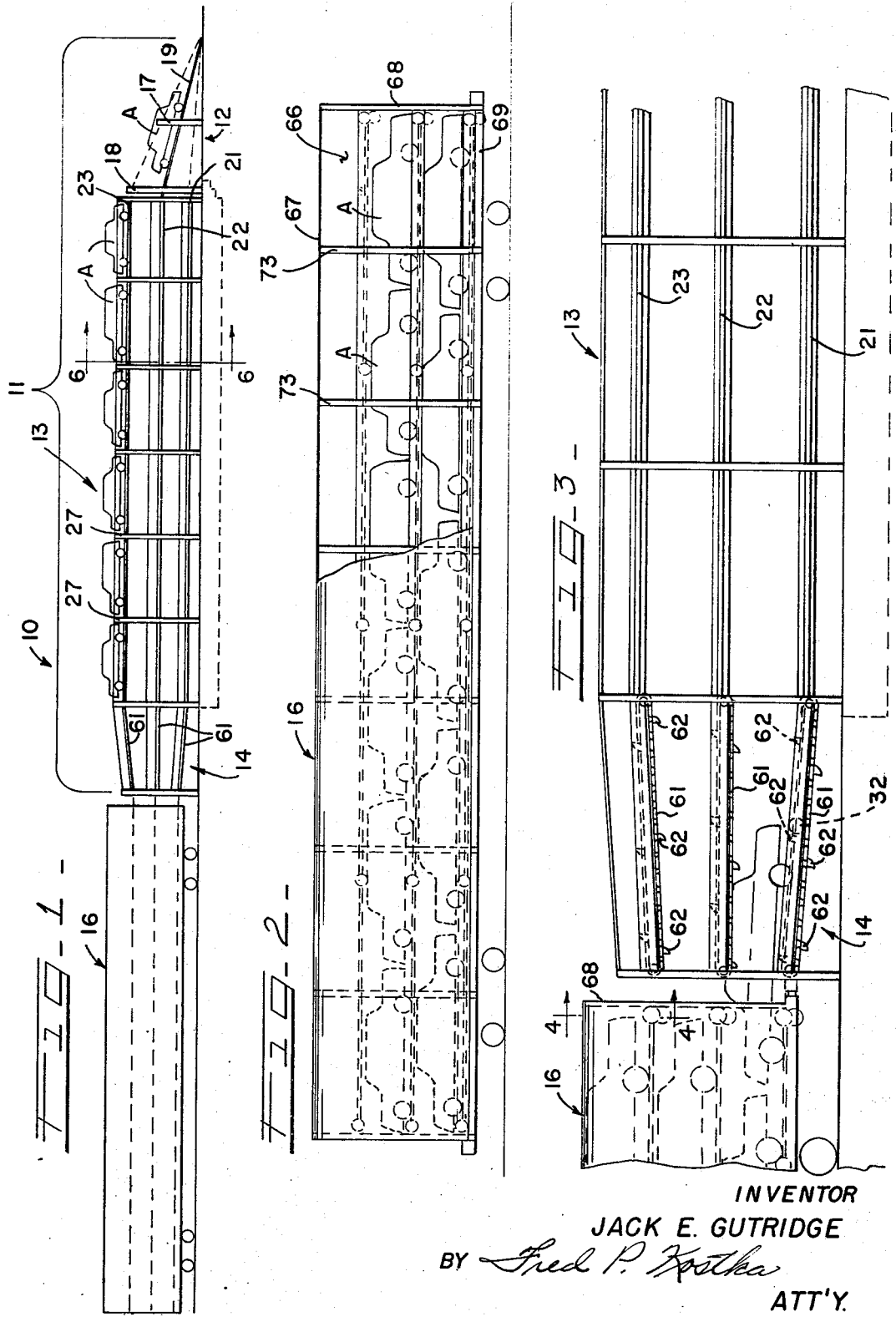

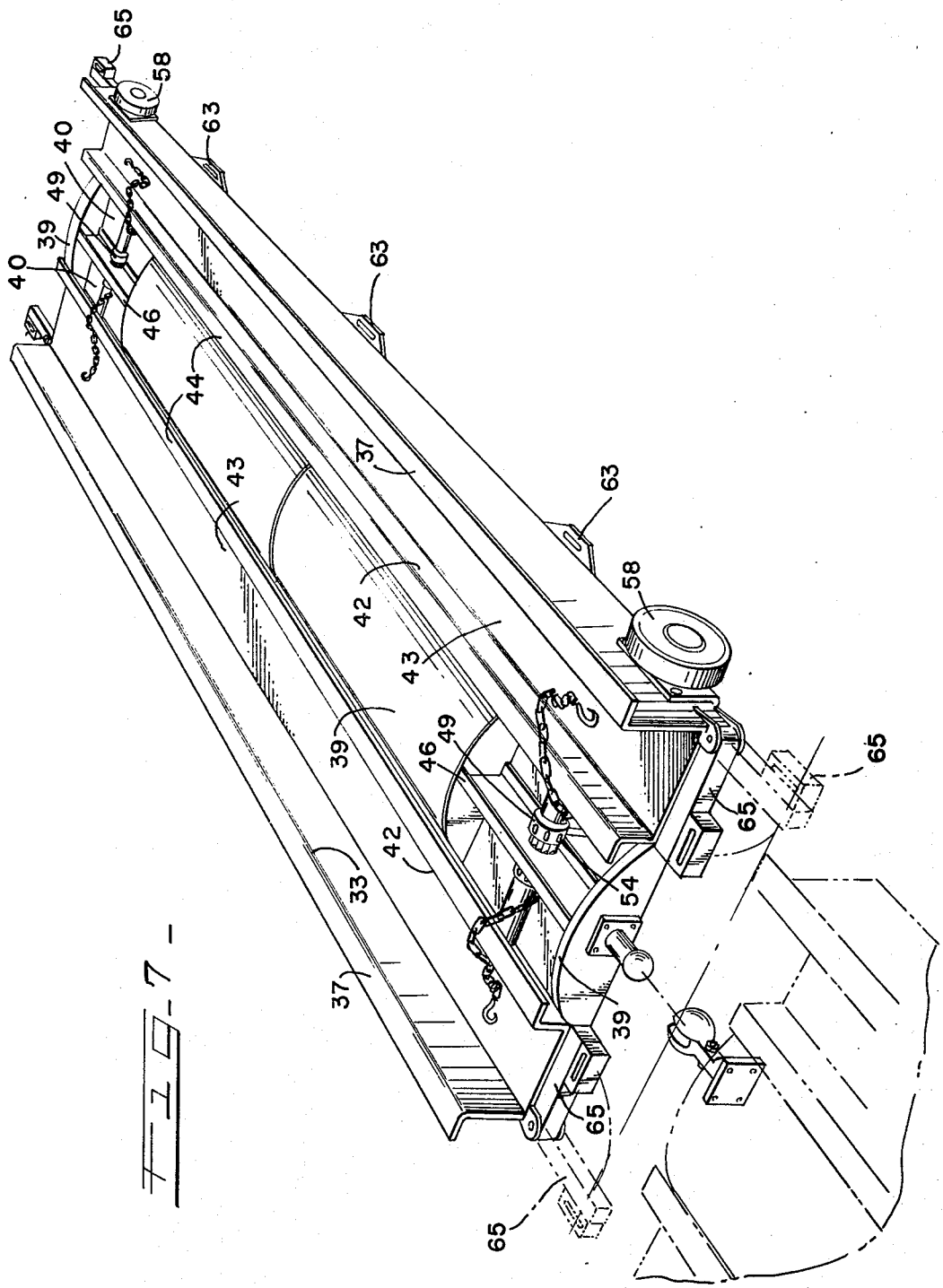

March 3, 1970 J. E. GUTRIDGE 3,498,480
AUTOMOBILE TRANSPORTING SYSTEM
Filed Dec. 14, 1966 4 Sheets-Sheet 4

INVENTOR
JACK E. GUTRIDGE
BY Fred P. Kostka
ATT'Y.

United States Patent Office 3,498,480
Patented Mar. 3, 1970

3,498,480
AUTOMOBILE TRANSPORTING SYSTEM
Jack E. Gutridge, Dyer, Ind., assignor to Pullman Incorporated, Chicago, Ill., a corporation of Delaware
Filed Dec. 14, 1966, Ser. No. 601,779
Int. Cl. B60p 3/08; B65j 1/22
U.S. Cl. 214—38                      10 Claims

ABSTRACT OF THE DISCLOSURE

A system for transporting automobiles by means of freight vehicles including a loading station onto which the automobiles are driven. The loading station includes a plurality of levels, each supporting a plurality of platforms onto which the automobiles are tied and thereafter transported by a conveying means to a freight vehicle. The freight vehicle is constructed to receive the platforms at different levels and is enclosed to minimize damage to the automobile during transit.

THE PRIOR ART

Heretofore automobiles have been transported on freight vehicles which were constructed as an open frame structure and included a plurality of decks. The automobiles are driven directly onto the freight vehicle and thereafter tied down for transit. This method of loading the automobiles on the freight vehicles frequently resulted in body damage to the vehicle during opening and closing of the automobile doors and the like. Damage to the automobile also occurred during transit because of the open frame structure of the freight vehicle due to weather conditions or vandalism or the like.

THE INVENTION

The automobile transporting system and apparatus of the present invention eliminates many of the problems encountered heretofore, particularly with respect to damage to the automobile. The automobile is driven onto a loading station and mounted on a movable platform which includes an automobile fastening arrangement which draws the automobile downwardly against the suspension means. The station is constructed such that ample space and clearance is provided for driving the automobile thereon and permits easy access into the automobile without damage thereto.

After the automobiles have been tied to the platforms, the latter are conveyed to the freight vehicle which is constructed to use the platforms as decks disposed at different levels. The conveyance of the platforms carrying the automobiles is accomplished with a minimum of handling by workers.

The freight vehicle is constructed at a height lesser than that required heretofore on autorack type freight vehicles because the automobile has been depressed against its suspension on the platform. This is of advantage in that the overall height of the freight vehicle may be reduced to eliminate many of the roadway clearance problems encountered heretofore.

In the drawings:

FIG. 1 is a side elevational view of the automobile transporting system embodying the principles of the present invention.

FIG. 2 is a side elevational view of the railway vehicle used in the system with some of the parts of the vehicle broken away to show underlying details of the construction.

FIG. 3 is a fragmentary view of the railway vehicle and the loading station used in the automobile transporting system.

FIG. 4 is a fragmentary sectional view showing the automotive carrying platform shown in a position mounted on the railway vehicle.

FIG. 5 is an end view of the railway vehicle showing the automotive vehicles positioned therein.

FIG. 6 is an end elevational view of the loading station and showing the manner in which the vehicle is fastened onto the automotive carrying platform.

FIG. 7 is a perspective view of the automotive carrying platform used on the loading station and the railway vehicle.

FIG. 8 is a sectional view taken generally along the lines 10—10 of FIG. 4 and showing the pawl and ratchet arrangement for tautening the holddown chains on the railway vehicle.

Figure 9:
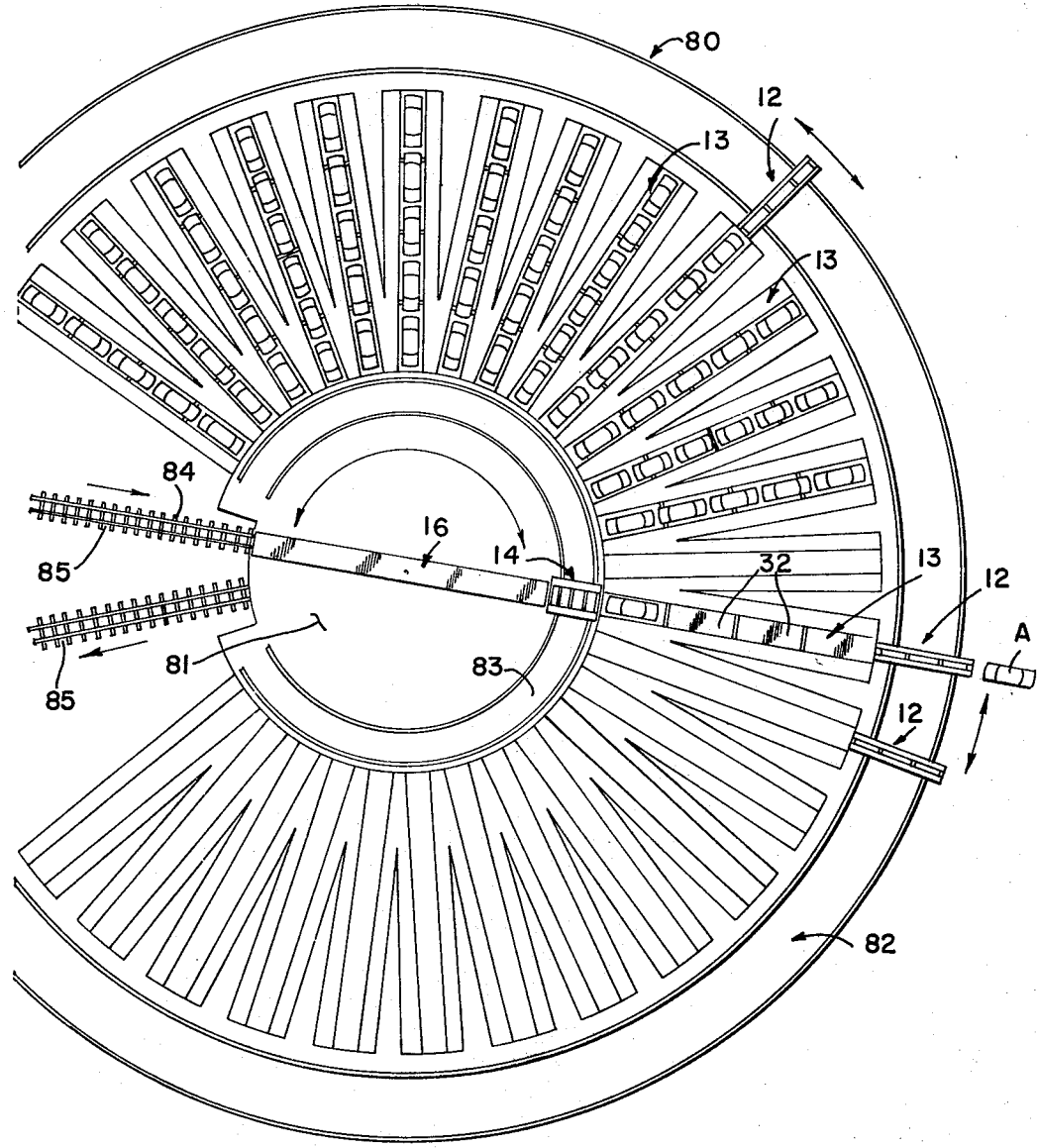
FIG. 9 is one embodiment of a turntable arrangement containing a plurality of the loading stations shown in FIGS. 1 and 3.

Referring now to the drawings and in particular to FIG. 1, there is shown the automobile transporting system 10 embodying the principles of the present invention. The automobile transporting system 10 comprises generally an automobile handling structure 11 including a loading ramp 12 on which the automobiles to be transported are driven onto a multitiered loading station 13. From the loading station 13 the automobiles A are conveyed on a conveying section 14 to a freight vehicle 16 which as shown is a railway vehicle particularly adapted for use in the system.

The loading ramp 12 may include lengthwise spaced pairs of transversely spaced upright posts 17 and 18 supporting therebetween an inclined platform 19 which is movable to one of a plurality of angular positions to drive the automobiles A to one of three floor levels 21, 22 and 23 on the loading station 13. Any suitable means may be used to angularly position the ramp 12.

The loading station as shown in particular in FIGS. 3 and 6 may include a foundation 24 having a pit 25 which is of sufficient depth to accommodate an individual in the standing position for reasons which will become more apparent hereinafter. The foundation 24 may be formed of poured concrete or the like and is depressed below the ground level. Mounted on upstanding sides 26 of the foundation are a plurality of longitudinally spaced columns 27 from each of which there extends vertically and transversely disposed pairs of aligned supporting beams 28—28 which are spaced from each other at the inner ends thereof. Supported and extending lengthwise between the beams 28 and the respective columns 27 are floor sheets 29 which provide side platforms at the floor levels 21, 22 and 23. Fixed to the inner ends of each of the floor beams 28—28 are substantially C-shaped channel members defining lengthwise extending trackways 31 which receive automobile loading platforms 32 on which the automobiles to be transported are fastened and mounted.

The automobile loading platforms 32, as shown in particular in FIGS. 4 and 7, are formed of a length at least as long as the wheel base of a full size automobile and preferably equal to the overall length thereof. The platform 32 includes a pair of transversely spaced Z-shaped channel members or sides 33, each including a lower horizontal leg 34 and an upstanding web 36 and an outwardly projecting ledge 37. Fixed to the lower legs of each of the sides 33 are a plurality of lengthwise spaced and transversely extending cross members 38. The cross members 38 are formed in the intermediate portion thereof with a dome 39 which is covered by a sheet. Extending lengthwise between the domes of the adjacent ones of the cross members 38 are transversely spaced reinforcing channels 41 between the outboard pairs of which there are disposed automobile tie-down mechanisms 40, more fully to be described hereinafter.

Extending along each side of the dome 39 is an upright web 42 of a floor sheet 43 which is supported on the channels 38. The floor sheets 43 and upright web 42 and side channels from runways which support and guide the wheels W of the automobile A on the platform 32. Extending from each of the upright webs 42 is an inwardly projecting horizontal flange which overlies the dome 39. Extending between the outboard cross members 38 and the adjacent one at each end is a longitudinally extending I-beam 46. It is to be noted that the end sections containing the I-beams are not covered with a sheet.

Referring now again to the tie-down mechanism 40, as shown in FIGS. 4, 7 and 8, disposed on each side of the I-beam 46 and the upright floor webs 42 are winches 47. The winches 47 are each turnably supported on trunnions 48—48 fixed to webs 42 and I-beam 46, respectively. Adjacent the inner end, the winches 47 are provided with a collar 49 having a plurality of angularly spaced openings 54 into which a wrench R or the like is adapted to be inserted. Holding the winch 47 for one way tightening as shown in FIG. 8 includes a pawl and rachet arrangement 50 mounted on the end of the winch 47 and I-beam 46. Encircling each of the winches 47 and having one end fixed thereto is a chain 52 to the other end of which there is attached a suitable attachment means such as a hook 53, which may be engaged with the underside of the automobile body. When the hooks 53 are attached to the undersides of the automobile bodies, the winches 47 are turned by means of the wrench R to depress the automobile body downwardly against the upward force of the automobile spring suspension means. In this manner the automobiles are fastened to the platform 32 for movement therewith.

It is to be particularly noted that this manner of attachment of the automobile on the pulatform 32 results in reducing the overall height of the automobile to the extent that the suspension means is compressed. This is of significance in the construction of the railway vehicle 16, as will be more readily apparent hereafter.

As shown in particular in FIG. 4, disposed below the tie-down mechanisms 40 is a cover plate 51 supported between the lengthwise spaced crossmembers 38 for sliding movement transversely of the platform 32. During loosening or tightening of the winches 47 the respective cover plates 51 are disposed away from the wrench collar 49, as shown, to permit access thereto. After the winches 47 have been tightened, the cover plates 51 are transversely moved to underlie the former whereby any drippings or the like from the automobile are collected thereon during transit.

Mounted adjacent the corners of the platform 32 on shafts 56, which are each fixed at one end to a fastening bracket 57, are wheels 58. The wheels 58 are adapted to ride in the longitudinally extending channel trackways 31 fixed to the ends of the transversely extending beams 28 of the loading station.

It is to be noted that the floor levels 21, 22 and 23 of the supporting platforms 32 thereon are separated a sufficient distance to permit a man to stand erect therebetween. Thus, the man tightening the winches 47 may be located on the floor level below that on which automobile A is positioned. It is further to be observed that the side columns 27 of the loading station 13 are spaced from the sides of the loading platform 32 to permit the opening and closing of the automobile doors without scraping or contacting the sides of the loading station and thereby preventing damage to the paint or body of the automobile.

The platforms 32 are adapted to be connected in an articulated manner as shown for example in FIG. 7. This is accomplished by providing one end thereof with a socket member 78 which receives a complementary coupling or ball member 79 extending from the opposite end of an adjacent platform 32. Thus, the conveyor system 14 is operative to simultaneously move a plurality of the connected platforms 32 carrying the automobiles A and move the platform along the loading station 13 to the railway car.

The forward end of the loading station 13 is provided with the conveying section 14 and may include a conveyor belt 61 for each of the floor levels 21, 22 and 23. Each of the conveyor belts 61 includes a plurality of upstanding sprockets 62 which are located so as to be engageable with complementary spaced slotted brackets 63 extending from the sides of the automobile carrying platform 32. To provide a connection to the sprockets 62 at the leading and trailing platform 32, there is pivotally attached to the ends of the latter slotted arms 65. The slotted arms 65 on the front end of the leading and trailing platforms 32 on each of the floor levels 21, 22 and 23 are swung to a longitudinal position as shown in FIG. 7 so as to be engageable with the sprockets 62 on the respective conveyor belts 61. The arms 65 on the other ends of the leading and trailing platforms 32 and the platforms disposed therebetween would be disposed in a stored position against the end cross members 38. Thus, during operation of the conveyor belts 61 the sprockets 62 engageable within the arms 65 and the brackets 63 are operative to transport the articulated line of platforms 32, each carrying the automobiles to the railway vehicle. It is to be observed that the upper and lower conveying belts 61 are inclined downwardly and upwardly, respectively, to align the platforms 32 with the loading supporting surface of the railway vehicle.

The railway vehicle 16 for the automobile transporting system of the present invention is constructed so as to substantially eliminate damage to the automobiles during transit. To this end the railway vehicle 10 is formed with sides 66, top 67 and the ends thereof may also be enclosed by way of a suitable door structure such as a folding door (not shown).

The railway vehicle 16 may be of the cushion underframe type as disclosed for example in Patent #3,003,436 or the standard underframe type with end-of-car cushioning.

Fixed between side sills 69 is a floor 71 formed from sheet metal which may be supported on bolsters, crossbearers and stringers (not shown) in the usual manner. Extending upwardly from each of the side sills 72 and spaced lengthwise of the vehicle 16 are a plurality of columns or posts 73 to which there is fixed an outer side sheathing forming the sides 66. Wear plates may be provided along the floor 71 and adjacent the side sills 69 on which the wheels 58 of the platform 32 are adapted to ride. Fixed to the side posts 73 are lengthwise extending angle members 77 which form an upper guide for the platform wheels 58.

Disposed between the top 67 and floor 71 of the car are two sets of vertically spaced trackways 76 and 77 formed by channel members extending lengthwise of the car and fixed to the side posts 73. The trackways 76, the floor 71 and roof are spaced a minimum distance apart so as to accommodate with a minimum of clearance the height of the automobiles A which are supported on the platforms 32 in a compressed condition. In view of the fact that the automobiles A have been compressed on the platforms 32 at the loading station 13, it is not necessary to provide deck clearances to accommodate the extended height of the automobiles A. For this reason the overall height of the railway vehicle 16 may be maintained at a lower height than conventional auto-rack railway vehicles wherein the automobiles have been loaded on the decks in the uncompressed state and subsequently compressed.

When one of the various levels 71, 76 and 77 of the railway vehicle is completely loaded, the platforms 32 may be fixed against lengthwise movement. One such means shown for example in FIG. 4 includes a thumb screw or pin 81 which is carried by the horizontal flange of each of the platforms on the side flanges 37. The pin seats within one of a plurality of longitudinally spaced openings 82 formed in each of the horizontal flanges of the trackways 74, 76 and 77. It is to be noted that when the railway vehicle 16 is fully loaded with the platforms 32 carrying the automobiles A thereon that the platforms 32 serve to impart lateral stability thereto.

Referring now to FIG. 9 there is shown a loading complex 80 including a plurality of loading stations 13. Such a loading complex 80 would usually be located at the automobile assembly plant. The loading stations 13 are radially disposed about a central turntable 81 on which the railway vehicle 16 to be loaded is disposed. Encircling the outboard ends of the loading stations 13 is a trackway 82 on which the loading ramp 12 is adapted to ride for positioning in alignment with one of the loading stations 13.

Concentrically disposed about the turntable 81 and adjacent the inboard end of the loading stations is a second trackway 83 on which the conveying section 14 may be positioned for selective alignment with the railway vehicle 16 and one of the loading stations 13 to be unloaded. At one side of the loading complex 80 there is provided a railway track 84 on which the empty railway vehicle 16 enters the turntable 81 and an exit track 85 from which the railway vehicle loaded with the automobiles leaves the loading complex 80.

Assuming now that an argument of the type shown in FIG. 1, including the loading station 11, ramp 12, and conveyor section 14, is used to load automobiles, the loading station 13 is initially provided with platforms 32 along the full length of each of the levels 21, 22 and 23. The platforms 32 on each of the levels are then articulated by connecting the ball connection 79 to the socket 78 at the adjacent ends thereof.

Automobiles A are driven up the ramp 19 to initially load the uppermost level 23 by driving the automobiles singly over the platforms 32 until each of the latter have an automobile A postioned thereon. An operator standing on the second level 22 is then in position to apply the tie-down mechanisms 40 on the forward and rear ends of the platforms 32 on the automobiles A and operate the winches 47 to compress the automobiles A against the force of the suspensions and thereby tie the latter for movement with the platform 32.

The lower levels 22 and 21 are loaded with automobiles as described above. When the loaded station is completely loaded with automobiles A the conveyor system 14 is set in operation. The conveyor belts 61 at the different levels may be operated simultaneously or in sequence preferably with the lower level 21 being operated first. For engaging the sprockets 62 on the belt 61 foldable slotted brackets 65 on the leading and trailing platforms 32 are extended to the longitudinal position. When the sprockets 62 engage the brackets 65 and 63, the entire line of automobile platforms 32 is moved onto the railway vehicle 16 with the platform wheels riding within the trackways defining the upper level or deck. As the last platform 32 of the line leaves the conveyor belt, the sprockets 62 on the latter in engagement with the longitudinal extending slotted bracket 65 serve to push the line of platforms into a properly oriented position on the railway vehicle. Thereafter, the line of platforms 32 are fixed against lengthwise movement of the railway vehicle 16 by postioning of the pins 81 within the openings 82 on the trackway channel 72. Each of the other levels 22 and 23 of platforms 32 may be similarly loaded on the railway vehicle 16.

At the destination of the railway vehicle 16, the latter is aligned with a similar loading station 13 preferably with the automobiles A on the platforms 32 having the fronts thereof facing the conveyor means. Thereafter the front and rear sprocket engaging brackets 66 on the leading and trailing platforms 32 are folded outwardly for engagement with the conveyor sprockets 61 and the locating pins 81, fixing the platforms against longitudinal movement retracted out of engagement with the openings 82.

Upon operation of the conveyor belts 61 the platforms 32 are transferred from the railway vehicle 16 to the loading station 13 in a manner similar to the loading procedure. When the floor levels 21, 22 and 23 of the loading station 13 are filled, the tie-down mechanisms 40 holding the automobiles A on the respective platforms 32 are released. Thereafter, the automobiles may be driven off the station via the ramp 19.

From the foregoing description it should be readily apparent that the automobile system and the apparatus of the present invention results in a minimum of damage and minimum handling of the automobile being transported. The automobiles are handled by drivers and laborers only when on the ground and on the loading station where there is adequate space to open and close doors without damage. Moreover, the tie-down equipment is so disposed that access may be had thereto without climbing on the automobiles. When the automobile is on the railway car it is substantially enclosed and protected from adverse weather and vandalism which may occur during transit.

What is claimed is:

1. A system for transporting vehicles on a railway car comprising a multi-level loading station, a plurality of inter-connectable platforms for mounting vehicles thereon, tie-down means on said platforms for tying the vehicle against the chassis so as to prevent substantial vertical movement of said vehicle and retaining the latter on said platform for movement therewith, means mounting said platforms on said loading station for lengthwise movement thereof, conveying means for moving said platforms along the length of said station in end-to-end relationship, and a railway car including means for supporting said platforms in multi-level relationship, said conveying means including means for transferring said platforms interconnectably from said loading station endwise into said railway car whereby the platforms are received endwise of the railway car.

2. The invention as defined in claim 1 wherein said loading station includes a plurality of vertically spaced levels on which said platforms are movably mounted.

3. The invention as defined in claim 2 wherein said levels on said loading station are equal to the number of levels on said railway car, and wherein said conveying means is located at and between each of said levels.

4. The invention as defined in claim 3 in which said platforms include means for connecting the same.

5. The invention according to claim 1, and said railway car for transporting vehicles comprising an underframe, a floor, sides extending upwardly from said floor, means mounting said platforms including lengthwise extending channel means fixed to said sides in vertically spaced relationship and defining trackways, said platforms extending lengthwise of said railway car and supported in said trackways.

6. A system for transporting vehicles on a railway car comprising a loading station, a plurality of platforms for mounting vehicles thereon, tie-down means on said platforms for tying the body against the chassis so as to prevent substantial vertical movement of said vehicle and retaining the latter on said platform for movement therewith, means mounting said platforms on said loading station for lengthwise movement thereof, conveying means for moving said platforms along the length of said station in end-to-end relationship, and a railway car including means for supporting said platforms in multi-level relationship, said conveying means including means for transferring said platforms from said loading station to said railway car, wherein there is provided a turntable on which said railway car is disposed and wherein a plurality of said loading stations are radially disposed about said turntable.

7. The invention as defined in claim 6 wherein said conveying means is movable concentrically about said turntable between said radially disposed loading stations so as to be selectively positionable relative to said railway car and one of said loading stations.

8. A vehicle conveyor for transferring of vehicles to a mobile vehicle carrier comprising a multi-level frame unit having a plurality of vertically stacked longitudinally extending vehicle deck structures, each of said deck structures being spaced vertically from one another a distance greater than the height of the vehicle, each deck structure including laterally spaced apart transversely extending platform supporting means, platform guide means connecting with each of the platform supporting means and including a pair of guide structures spaced apart laterally of one another and extending longitudinally of the vehicle conveyor, each guide structure at each level defining with the other guide structure a trackway for receiving movable platforms, a plurality of intercouplable movable platforms each of sufficient longitudinal extent to support a vehicle and including laterally spaced longitudinally extending treadways over which the wheels of the vehicle may traverse, each platform having transversely extending fore and aft means engaging with each of a pair of guide structures for longitudinal movement in said trackway and fore and aft vehicle tie-down means on each platform intercouplable with the vehicle, each platform being in end-to-end tandem relation with an adjacent platform, and wherein there is provided a turntable on which a mobile vehicle carrier is disposed and wherein a plurality of said vehicle conveyors are radially disposed about said turntable.

9. The invention according to claim 8 and wherein said conveying means is movable concentrically about said turntable between said radially disposed vehicle conveyors so as to be selectively positionable relative to said mobile vehicle carrier and one of said vehicle conveyors.

10. A vehicle conveyor for transferring of vehicles to a mobile vehicle carrier comprising a multi-level frame unit having a plurality of vertically stacked longitudinally extending vehicle deck structures, each of said deck structures being spaced vertically from one another a distance greater than the height of the vehicle, each deck structure including, laterally spaced apart transversely extending platform supporting means, platform guide means connecting with each of the platform supporting means and including a pair of guide structures spaced apart laterally of one another and extending longitudinally of the vehicle conveyor, each guide structure at each level defining with the other guide structure a trackway for receiving movable platforms, a plurality of intercouplable movable platforms each of sufficient longitudinal extent to support a vehicle and including laterally spaced longitudinally extending treadways over which the wheels of the vehicle may traverse, each platform having transversely extending fore and aft means engaging with each of a pair of guide structures for longitudinal movement in said trackway and fore and aft vehicle tie-down means on each platform intercouplable with the vehicle, each platform being in end-to-end tandem relation with an adjacent platform, and platform conveying means mounted on the frame unit at each level at the exit end thereof for conducting a plurality of intercoupled platforms lengthwise of the frame unit for transferring the platforms from the vehicle conveyor to a mobile vehicle carrier, and means on each platform being engageable with said conveyor means for carrying the platforms outwardly of the conveyor, and wherein there is provided a turntable on which a mobile vehicle carrier is disposed and wherein a plurality of said vehicle conveyors are radially disposed about said turntable.

References Cited

UNITED STATES PATENTS

| | | | |
|---|---|---|---|
| 1,086,670 | 2/1914 | Jory et al. | 105—368 X |
| 1,581,745 | 4/1926 | Kellett | 214—38 |
| 1,750,128 | 3/1930 | Romine | 214—38 |
| 1,750,131 | 3/1930 | Romine | 214—38 X |
| 2,087,249 | 7/1937 | Fitch | 214—38 |
| 2,204,034 | 6/1940 | Cooper et al. | 105—368 |
| 2,524,260 | 10/1950 | Hutson. | |
| 2,903,978 | 9/1959 | Gaynor. | |
| 2,711,835 | 6/1955 | Kappen | 214—38 |
| 2,820,560 | 1/1958 | Davis | 214—38 X |
| 2,841,436 | 7/1938 | Stuart | 296—1 |
| 3,032,212 | 5/1962 | Gaskin et al. | 214—16.1 |
| 3,215,090 | 11/1965 | Gibbs | 214—38 X |

FOREIGN PATENTS 1,280,500   11/1961   France.

GERALD M. FORLENZA, Primary Examiner

FRANK E. WERNER, Assistant Examiner

U.S. Cl. X.R.

105—368; 214—16.1